Jan. 12, 1965 A. T. BACHELER 3,165,683
MOTOR CONTROL
Filed June 27, 1961 2 Sheets-Sheet 1

Jan. 12, 1965   A. T. BACHELER   3,165,683
MOTOR CONTROL

Filed June 27, 1961   2 Sheets-Sheet 2

WITNESSES

INVENTOR
Albert T. Bacheler
BY
ATTORNEY 3,165,683
MOTOR CONTROL
Albert T. Bacheler, Eggertsville, N.Y., assignor to Westinghouse Electric Corporation, East Pittsburgh, Pa., a corporation of Pennsylvania
Filed June 27, 1961, Ser. No. 119,971
5 Claims. (Cl. 318—44)

This invention relates to plural electric motor systems and more particularly to apparatus for concurrent control of a plurality of wound-secondary induction motors.

It is well known to control the speed of an induction motor by varying the resistance of its rotor circuit. This is effected by inserting a variable external resistance in circuit with a wound rotor through slip rings. It has been previously proposed to control two wound-rotor motors with a common variable resistance connected across both rotors. However, such a system is subject to electrical synchronization and mechanical lock-in below about two-thirds speed, and a tendency to randomly fall in and out of step above two-thirds speed, creating undesirable pulsations in the system. Another disadvantage of such a system is the failure of the motors to share a common mechanical load in accordance with their capabilities or ratings when the several inputs of such load are mechanically free to turn more than a few degrees relative to each other.

An example of the inadequacy of the prior proposed systems may be illustrated by a system wherein a plurality of motors supply power at a number of points to a sprocket chain conveyor through sprockets. If the "effective" length of the chain changes because of wear, temperature, or other cause, conditions can arise where the load will be unevenly shared by the motors, while other conditions could arise causing breakage or damage to the chain or motors. If the "effective" length of the chain increases between the motor points, jerky operation will result with one or the other motor attempting to take all of the load as it is imposed on it. If the "effective" length of the chain is shortened between motor points, forces attempting to enforce synchronization or lock-in could break the chain or damage the motors or gearing. All of this is due in part to the fact that the motors are committed to absolute electrically synchronous operation.

It can also be seen that if wound-rotor induction motors are to be controlled in unison by a common secondary resistor, they will have to run under two-thirds speed to avoid instability. This means that for a given purpose larger motors must be used.

The present invention avoids the above disadvantages by rectifying the secondary currents of the wound-rotor motors before being applied to a common secondary resistor. In accordance with a preferred embodiment of the present invention, the respective secondary currents of the wound secondaries of a plurality of induction motors are each individually rectified and the rectified outputs are all connected in parallel across a common adjustable resistor. In another embodiment the rectifier outputs are connected in series with each other, and the resistor is connected across the series connection as a common load on the rectifiers. This results in equal torques for all motors even at widely different speeds.

It is an object of the present invention to provide a novel speed control system for a plurality of motors with wound secondaries.

Another object of the present invention is to operate a plurality of wound-secondary induction motors from a common variable secondary resistance without the usual tendency to lock into step.

Another object of the invention is to provide a plural motor system using a common secondary resistor but with the ability to operate as a group over their entire available speed range.

Another object of the invention is to provide a plural motor system employing motors having wound secondaries with a novel speed control system using a resistor common to the secondaries of all the motors.

A further object is to provide a plural motor system employing induction motors having wound secondaries with a common control system including a resistor common to the secondaries of all the motors, the control system having any one or more of the following characteristics:

Concurrent operation at same speed (similar motors) with freedom from forced electrical synchronization; concurrent operation of motors at same or relative speeds with freedom from forced phase locking with respect to each other (similar motors) or to respective references (dissimilar motors); ability to accelerate all motors approximately in unison; ability to share load in accordance with their respective ratings when motors are coupled to a common mechanical load; equal torques for all motors even at widely different speeds between motors.

Other and further objects and advantages of the present invention will be apparent from the following description, reference being had to the accompanying drawing, wherein a preferred form of the invention is shown.

Figure 1:
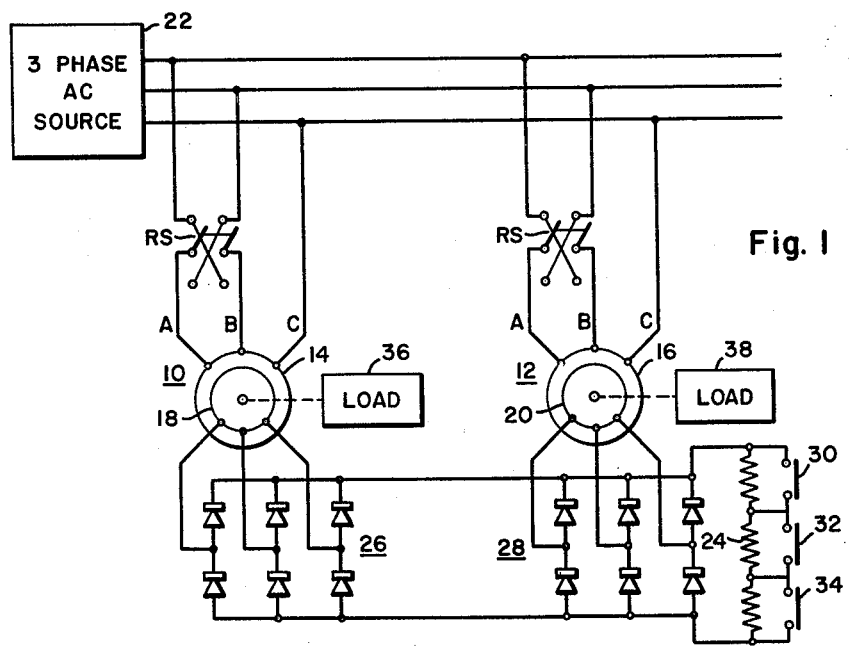
FIG. 1 is a schematic diagram of a plural motor system embodying the invention.

The system in FIG. 1 includes two induction motors 10 and 12 having respective primaries 14 and 16, and respective wound secondaries 18 and 20. Each of the motor primaries 14 and 16 is connected through three phase lines A, B and C to a source 22 of three-phase alternating current. The connection to phase lines A and B of each motor is through a reversing switch RS. The respective reversing switches RS may be independent of each other or may be ganged for common reversing control.

Each of the secondaries 18 and 20 is coupled to a common load in the form of an adjustable resistor 24 through a rectifier individual to that particular motor winding. More specifically, secondary 18 of motor 10 is coupled to the input of a three-phase bridge rectifier 26 whose output is connected across resistor 24. In like manner, secondary 20 is connected, through a three-phase bridge rectifier 28, across the resistor 24. The positive terminals of rectifiers 26 and 28 are connected to one end of resistor 24, while the negative terminals of the rectifier are connected to the other end of the resistor. Thus, the outputs of the rectifiers 26 and 28 are connected in parallel and in like polarity across the resistor 24. The amount of resistor 24 inserted into the circuit is adjustable from zero to maximum by switches 30, 32 and 34, which can selectively short parts or all of the resistor.

Although their positions are interchangeable, the primary and secondary of each motor are respectively shown as the stator and armature. For example, in motor 10 the primary 14 is shown as the stator of the motor, while the secondary 18 is shown as the armature or movable element of the motor. While not restricted thereto, the motors are shown as rotary motors, in which case the armatures are rotors. Rotary motors of this type are known as wound-rotor motors. It will be appreciated that the motors may be other than rotary, for example, a rectilinear motor, all of which are included in the broad term "wound-secondary" induction motors.

Rotor 18 of motor 10 is coupled to drive a mechanical load 36, while the rotor 20 of motor 12 is coupled to a load 38. These loads may be separate independent loads, or they may be a common load. As an example of a common load, loads 36, 38 and 40 may be spaced sprocket drives for driving a link chain conveyor at spaced points along the length of the chain.

As a result of the rectification of the respective secondary currents, the current through and voltage across the resistor 24 are D.-C. The conversion to D.-C. eliminates the phase-position relationships of the various secondary circuits when viewed from the D.-C. side of the rectifiers, and thereby eliminates the synchronizing action that would otherwise exist between the motors if the secondary currents were not rectified. Because of the removal of this phase synchronizing action, the wound-rotor motor system with individual rectifiers and a common secondary resistor provides the ability to operate wound-rotor motors together as a group over their entire available speed range. Additionally, the conversion to D.-C. destroys the phase sequence relationship of the respective motor secondary voltages and currents. Because of the removal of this effect, one motor may be reversed with respect to other motors in the system by reversing only the primary connections to the motor. It is not necessary to reverse the secondary connections. The conversion to D.-C. also reduces the number of secondary leads to the resistor to a maximum of two. This will result in a saving of current collector and trolley wire equipment when used in applications where the motors are mounted on travelling equipment. Without the rectifiers, group control would be restricted to two-thirds speed of the available range of each motor.

The voltage across resistor 23 is common to all the motors, and if the motors are wound to have the same rotor voltages for the same slips, they will tend to run at identical slips regardless of what the value of the secondary resistor 24 may be. If the motors also have the same number of poles, they will tend to run at identical speeds. However, if the motors do not have the same number of poles but are wound for the same secondary voltages for the same slips, then the motors will tend to run at relative speeds inversely proportional to the number of poles on the respective motors. If the motors are not wound for the same secondary voltages for the same slips, they will maintain a fixed relative slip dictated by the slips at which the respective motors will run at the same secondary voltage. The resistance in the individual motors and rectifiers will make the motors have droop and share load among themselves as explained below. Because the voltage across the secondary resistor is set by the total load, each individual motor will have flatter speed regulation from no load to full load than if it were connected only to its own secondary resistor. The approximate improvement in regulation is in inverse proportion to the ratio of individual motor horsepower to total horsepower. Motors connected as in FIG. 1 will accelerate in approximate unison, even if the load does not tend to hold them together, and will operate together at any speed set by the value of the secondary resistance 24. Because of the freedom from forced phase locking, the motors in the system of FIG. 1 will, when flexibly coupled to and driving a common mechanical load, stabilize at the speed and relative angular positions at which the load is divided and shared among themselves in proportion to their respective power ratings. The latter attribute is taken advantage of in the conveyor scheme of FIG. 2.

Figure 2:
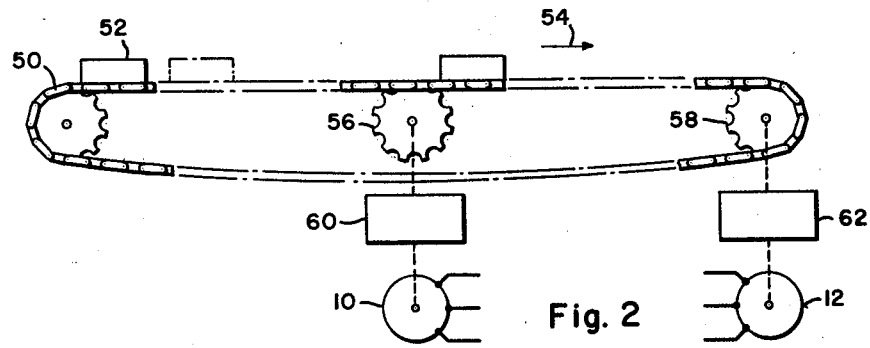
FIGS. 2 and 3 are diagrams of sprocket chain conveyor systems driven by the motor system of FIG. 1.

In FIG. 2, a chain conveyor 50 for conveying loads 52 in the direction of the arrow 54 is shown as being driven at two points by sprockets 56 and 58, respectively, whose teeth engage the links of the chain. Sprockets 56 and 58 are respectively driven through gear boxes 60 and 62 by motors 10 and 12 of the system in FIG. 1. Although only the motors 10 and 12 of the system of FIG. 1 are shown in FIG. 2, it should be understood that the power supply and control system of FIG. 1 is incorporated by reference into FIG. 2 for the supply and control of the motors.

Such factors as temperature and wear may cause the chain 50 to slacken or tighten between sprockets 56 and 58. Tendency to develop slack between sprockets 56 and 58 when the "effective" length of the chain is increased due to, for example, wear, will be compensated for in the following manner. Tendency to develop slack will tend to increase load on one motor and decrease load on the other motor when the conveyor is loaded. If the load on motor 10 is increased due to slack developing in the chain between sprockets 56 and 58, motor 10 will slow down, and at the resulting increased slip, generate a higher A.C. rotor voltage. Since the back tension of the chain is reduced, the load on motor 12 is decreased, and motor 12 speeds up resulting in a lower generated A.C. rotor voltage. Because the D.C. voltage across the resistor is common to both motors, a greater voltage drop exists from the secondary winding to the D.C. circuit through the impedance of the motor secondary winding and rectifier of motor 10 than of motor 12. As a consequence the secondary current and torque of motor 10 become greater than that of motor 12, and each motor tends to carry its own load at a speed relatively close to that of the other motor.

When the slack has been taken up again, due to motor 12 running slightly faster than motor 10, the speeds again become equal. Motor 12 is slowed down because of the tension re-established in the chain, and motor 10 is increased in speed because tension in the chain has picked up part of the load. With the motors again running at the same speed, the generated secondary voltages are again the same, and therefore the voltage drops through motor secondary windings and rectifiers to the common D.C. load are the same for both motors.

The motors inherently tend to have winding resistances inversely proportional to rating, and therefore currents and torques will tend to divide in proportion to rating when the speeds are the same. The proportional division of load just described is the same as that which existed prior to the introduction of slack in the above example, but the relative positions of the motors are different since the system is independent of relative rotor positions and permits one motor to make any angular rotation with respect to the other motor without affecting the ability to divide load at identical speeds. The same forces operate to prevent overload of one motor in the case where the effective length of the chain between the driving sprockets decreases, for example due to temperature changes. Because of the elimination of phase-locking, the system is "soft" and allows each motor to assume the angular position required to pull on the chain only in proportion to its own rating. This prevents overloading of a motor when the chain tightens between the driving sprockets.

Figure 3:
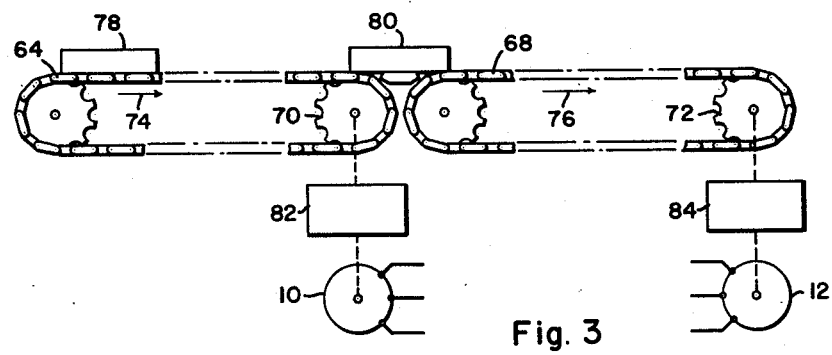

In FIG. 3 adjacent conveyor chains 64 and 68 are driven by sprockets 70 and 72 in the direction of arrows 74 and 76. With this arrangement loads 78 and 80 are conveyed by chain 64 and transferred to chain 68 for further conveyance in the direction of the arrows. Sprockets 70 and 72 are respectively driven through gear boxes 82 and 84 by the motors 10 and 12 of FIG. 1. Although not shown in FIG. 3, the motors 10 and 12 of this figure are supplied and controlled by the control system of FIG. 1.

When handling delicate material such as a roll of paper it is desired that the speeds of chains 64 and 68 are approximately the same when the load is at A. When bridging the gap at B it would be desirable to have the speeds of the conveyors exactly matched. With the control system of FIG. 1 the motors 10 and 12 are free to assume the same speed without respect to electrical phase position of the rotors. The actual synchronizing will be done between the conveyor chains 64 and 68 by friction between the load and the carrying surfaces of the chains.

If the secondary voltages of the motors are the same for the speeds involved and if it is assumed that the rectifiers have similar characteristics, the rotor resistance of each motor will be approximately inversely proportional to its horsepower rating, thereby giving it the same percentage droop in speed-torque curve in relationship to its rating, under which conditions the motors will divide load in proportion to their ratings. It is again emphasized that with this system the full range of speed is availed of instead of merely two-thirds speed, thus saving on motor size. If the scheme of FIG. 3 with a common load is attempted without the rectifiers in the motor control system, at above two-thirds speed the motors will tend to fall out of step, pulsate, and create undesirable instability, thus forcing the use of fifty percent larger motors to obtain the speed range available to the smaller motors when rectifiers are used in the system. Additionally, without the rectifiers, resistor losses are greater and speed regulation is poorer.

Although only two motors are shown in the system of FIG. 1, the invention is equally applicable to and may be practiced with more than two motors. Additional motors are connected into the circuit in the same manner as those shown in FIG. 1. Each additional motor requires a separate rectifier whose input is connected to the wound rotor of the motor, and whose output is connected across the resistor in the same manner as the outputs of rectifiers 26 and 28.

In the embodiment of the invention shown in FIG. 4, rectifiers are again employed in the rotor resistance control circuits to eliminate the phase locking tendency. However, in this configuration the rectifiers are connected in series with each other and the common load resistor as contrasted with the parallel connections of FIG. 2.

Figure 4:
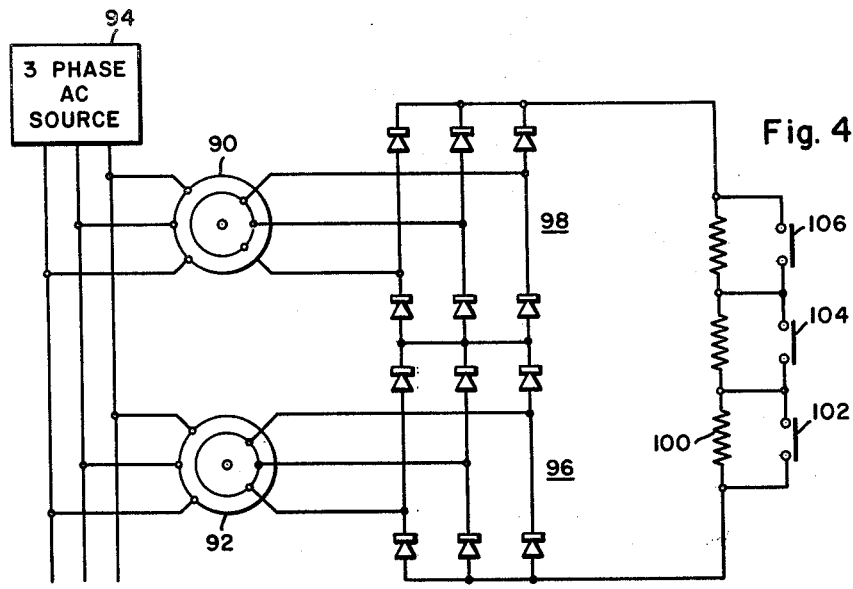
FIG. 4 is a schematic diagram of another embodiment of the invention. In this figure the rectifiers are connected in series with each other instead of in parallel as in FIG. 1.

More specifically the circuit in FIG. 4 includes wound rotor induction motors 90 and 92 having their respective stators connected to a three-phase A.-C. source 94, and their respective rotors connected to three-phase bridge rectifiers 96 and 98, whose outputs are connected in series with each other and with a resistor 100. The value of the resistor is adjustable from zero to maximum resistance by the short-circuiting or shunting switches 102, 104 and 106 connectable across portions of the resistor 100. The circuit of FIG. 4 also destroys phase locking characteristics. Additionally it provides for equal torques in the two motors, and the motors have no tendency to run at the same speed. The torques are equal even if the speeds are widely different. As in the circuit of FIG. 1, the conversion to D.-C. destroys the phase sequence relationship of the respective motor secondary voltages and currents, permitting easy reversal of one motor with respect to the other by reversing only the primary connections to the motor.

Figure 5:
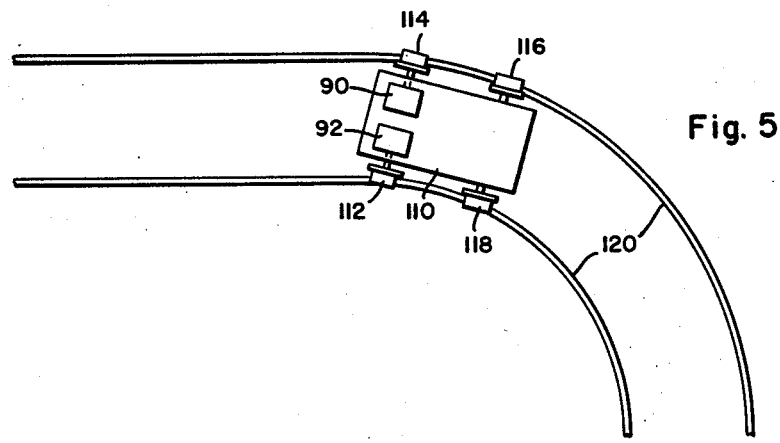
FIG. 5 is a diagram of a crane system driven by the motor system of FIG. 4.

An application of the system of FIG. 4 is a drive for the two sides of a crane structure that has to run on straight and curved tracks, thus requiring that the motors be capable of operating at different speeds when running on the curved track section, or at the same speeds on straight section of track. In this application it is also desirable to divide the torque equally, which the system of FIG. 4 will do. Such a system is shown in FIG. 5 wherein a crane carriage 110 is supported on wheels 112, 114, 116 and 118 riding on tracks 120. The motors 90 and 92 of FIG. 4 are mounted on the crane carriage 110 to drive wheels 114 and 112, respectively. While the rest of the control system of FIG. 4 is not shown in FIG. 5, it is to be understood that the entire system of FIG. 4 is connected to the motors 90 and 92 of FIG. 5.

Although only two motors are shown in the system of FIG. 4, that circuit configuration may include more than two motors with their respective rotors connected to individual rectifiers, all of which are connected in series with each other and with the common load resistor 100.

It is to be understood that the herein described arrangements are simply illustrative of the principles of the invention, and that other embodiments and applications are within the spirit and scope of the invention.

I claim as my invention:

1. An electric motor system comprising a plurality of induction motors each having a wound secondary, a like plurality of rectifiers, each having an input and an output, said secondary of each motor being coupled to the input of a different one of said rectifiers, resistance means, and means connecting the outputs of said rectifiers to said resistance means, whereby said resistance means is a load on said rectifiers.

2. An electric motor system comprising a plurality of induction motors each having a wound secondary, a like plurality of rectifiers each having an input and an output, each of said secondaries being connected to the input of a different one of said rectifiers, resistive means, and means coupling the outputs of said rectifiers in parallel and like polarity across said resistive means.

3. An electric motor system comprising a plurality of induction motors each having a wound secondary, a corresponding plurality of rectifiers each having an input and an output, each of said secondaries being connected to the input of a different one of said rectifiers, adjustable resistance means, and means coupling the outputs of said rectifiers in parallel and like polarity across said resistance means.

4. An electric motor system comprising a plurality of induction motors each having a wound secondary, a like plurality of rectifiers, each having an input and an output, said secondary of each motor being coupled to the input of a different one of said rectifiers, resistive means, and means connecting the outputs of said rectifiers in series with each other and with said resistive means.

5. An electric motor system comprising a plurality of induction motors each having a wound rotor, a corresponding plurality of rectifiers, each having an input and an output, the windings of each rotor being coupled to the input of a different one of said rectifiers, adjustable resistive means, the outputs of said rectifiers being connected in series with each other, and means connecting said resistance means in series with said series connected rectifier outputs.

References Cited in the file of this patent

UNITED STATES PATENTS 2,835,859    Burns  ---------------- May 20, 1958